Nov. 20, 1951     J. R. BENNETT     2,575,858
RESILIENT MOUNTING

Filed Feb. 27, 1947

INVENTOR
John R. Bennett
BY Evans & McCoy
ATTORNEYS

Patented Nov. 20, 1951

2,575,858

UNITED STATES PATENT OFFICE 2,575,858

RESILIENT MOUNTING

John R. Bennett, Wabash, Ind., assignor to The General Tire and Rubber Company, Akron, Ohio, a corporation of Ohio Application February 27, 1947, Serial No. 731,307

13 Claims. (Cl. 248—26)

This invention relates to a resilient suspension or cushioning device employing rubber as a means of resilience.

To effectively absorb vibrations, particularly those of low frequency, the softest possible mounting is desired. With such mountings, however, the movement of the mounted member may become relatively large upon relatively small disturbances, with the result that breaking of connections between the mounted member and the base member may occur. The use of a stop to limit excessive vibrations is undesirable because of the suddenness with which it makes contact with the mounted member. In practice therefore, a compromise is made, using a much stiffer mounting than desired, which mounting is too stiff to prevent the transmission of low frequency vibrations but soft enough to prevent the transmission of higher frequency vibrations. For such mountings, rubber largely under compression and shear has generally been used, even though rubber under compression is relatively rigid.

It is an object of the present invention to provide an antivibration mounting or suspension device which gives the advantages of a very light suspension for ordinary deflections, but gradually and without jar limits the deflection when it becomes excessively large.

It is another object of the present invention to provide a vibration-absorbing mounting or support which has a variable load deflection characteristic for stress in any direction and which gives a very high deflection per unit of load for ordinary deflections.

Other objects will be apparent from the following description of the invention as illustrated by the accompanying drawing, in which.

Figure 3:
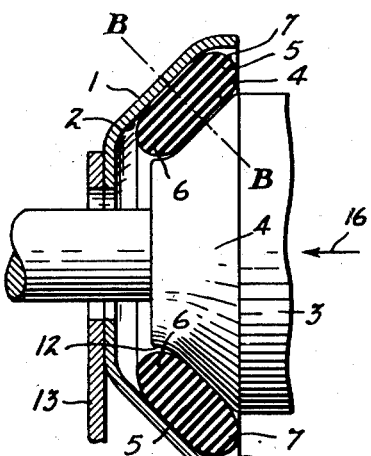

Fig. 3 is a similar sectional view through the same mounting when it is in the highly loaded state, as when the mounting is excessively strained by excessive movement of the mounted member in the direction of the arrow relative to the base or mounting member, showing the major axis of the resilient member parallel to the bearing surfaces of the rigid members so that greater rigidity to further deflection is had.

Figure 2:
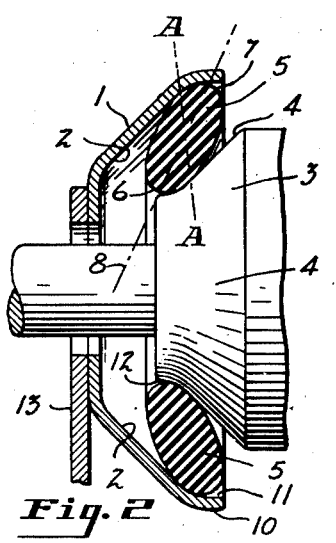
Fig. 2 is an enlarged, longitudinal sectional view of the normally loaded mounting illustrated in Fig. 1, showing a portion of the mounted member.
Figure 4:
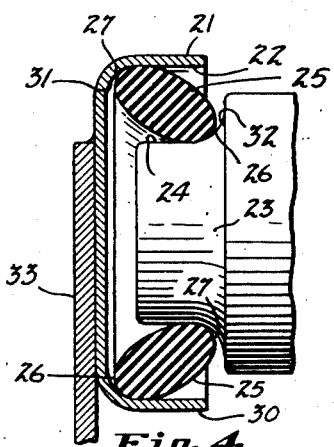
Figure 5:
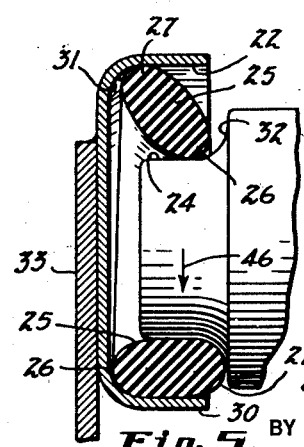
Figure 6:
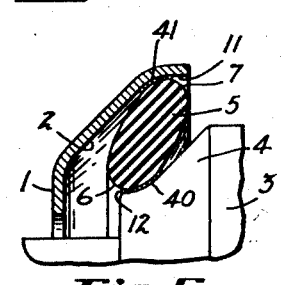

Fig. 4 is a longitudinal sectional view of a modified form of mounting embodying the present invention, showing a portion of the mounted member;

Fig. 5 is a view of the same mounting as that of Fig. 4 except that a portion of the mounting is in the highly loaded state due to load in the direction of the arrow shown; and Fig. 6 is a sectional view through a portion of another modified form of mounting similar in form to that of Fig. 2.

In accordance with the present invention, a resilient member or the noncircular section, with one diameter or axis substantially greater than the other, is interposed between annular bearing surfaces (preferably substantially parallel) of two rigid members, with its larger axis or diameter at an acute angle to the bearing surfaces, or if they are not flat at an acute angle to the chord subtended by the arcuate bearing surface so that resistance to rolling action is utilized to obtain relatively high deflection at low loadings, and the compressive stress required to deform the section of the annulus is gradually utilized to obtain the relatively stronger deflections at the higher loadings. The bearing surfaces of the rigid members are preferably shaped to provide annular contact with the resilient member.

Referring more particularly to the drawings, wherein like parts are designated by like numerals of reference throughout the several views, the mounting of the present invention may have an outer rigid member 1 having an inner, annular bearing surface 2, which is preferably frusto-conical as shown, an inner rigid member 3 having an outer, annular bearing surface 4, which is also preferably frusto-conical and substantially concentric with and parallel to the inner bearing surface 2 of the outer member 1, and an annulus of resilient material 5. The annulus 5 has a section of oblong shape (preferably elliptical) with rounded end portions. One dimension of the cross section of the annulus is preferably at least 1.5 times the other and this major axis or diameter is disposed at an acute angle to the line formed by a longitudinal sectional plane through the bearing surfaces or to the arcs subtended thereby, so that upon movement of these bearing surfaces more closely together, distortion or inside-out rolling of the annulus causes stretching of the one peripheral portion 6 thereof and compression of the outer peripheral portion 7 thereof.

The major axis or preponerant diameter 8 of the resilient member in the normally loaded mounting preferably makes an angle about 20 to 60° with the line formed by a longitudinal plane of the bearing surfaces 2 and 4, or if this line is arcuate or curved, then the major axis or greater dimension is molded at an angle to the chord subtended thereby.

One rigid member is attached to the mounting member or frame 13 and the other rigid member 4 is attached to the mounted member 14. In the case of mounted members having a rotatable shaft, it is especially desirable to utilize two mountings, one at each end of the mounted member and substantially concentric with the shaft or axis thereof, as shown.

The spacing of the rigid members under normal load is so adjusted and the proportions so proportioned to normally permit portions of the bearing surfaces 2 and 4 to be moved in the directions of the arrows 15 with tilting of the major sectional diameter or axis 8 and resultant stretching of one portion 6 and compression of another portion 7. The line joining the center of the contacting areas on the bearing surfaces 2 and 4 shifts with deflection of the mounting from A—A' as shown in Fig. 2 to B—B' of Fig. 3, and progressively greater contact is had between the annulus and the bearing surfaces when the deflection is increased.

Figure 1:
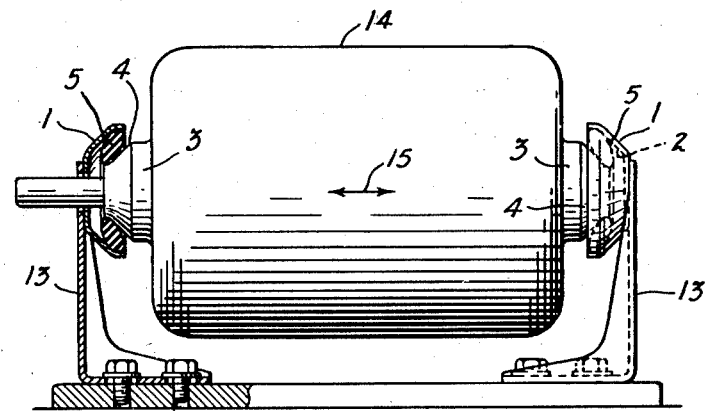
Figure 1 is a side elevational view, partly in section, of a system comprising a mounted member carried on a support by a vibration-absorbing and insulating mounting embodying the present invention.

In the modification shown in Figs. 1 to 3, inclusive, the bearing surface 2 of the inner member is frusto-conical in shape and the bearing surface 4 of the inner member is also frusto-conical in shape and substantially concentric with that of the bearing surface 2. A portion 10 of the outer member at an outer peripheral portion of the bearing surface 2 is preferably turned over or dished to provide a seat 11 for the elliptical annulus 5 to facilitate assembly and prevent slippage. The seat 11 has an annular surface at an angle to the bearing surfaces. A locating, annular seat 12 is also preferably provided on the inner rigid member 3 at an inner peripheral portion of the bearing surface 4. The spacing between the seats 11 and 12, which may have curved surfaces at an angle to the remainder of the respective bearing surfaces, is preferably just sufficient to provide free rolling action of the annulus. The annulus 5 is preferably molded flat or with the major axis 8 of diagonally opposite sections thereof parallel so that deflection to the state illustrated in Fig. 2 gives sufficient resistance to support the normal load, as shown.

In the modification shown in Figs. 4 and 5, the numerals of reference differ by twenty digits from those of corresponding elements of Figs. 1 to 3, inclusive. The inner and outer rigid members 21 and 23 have inner and outer bearing surfaces 22 and 24, respectively, which are coaxial and which are cylindrical in shape. Seats 31 and 32, which are disposed along a peripheral edge region of the inner and outer bearing surfaces 22 and 24, respectively, like the seats 11 and 12 of the earlier described modification have surfaces forming an angle of less than 160°, and preferably between 60 and 150°, with the longitudinal lines in the remainder of the respective bearing surfaces, or with the chord subtended by such lines. The seats 31 and 32 function like the seats 11 and 12 of the modification shown in Figs. 1 to 3.

The major axis of the oblong section of the resilient member 25 is disposed in a normally loaded mounting at an acute angle to the bearing surfaces 22 and 24. which again are preferably substantially parallel. Thrust in the direction of the arrow 46 like thrust in the direction of the arrow 16 of Fig. 3 causes tilting of the major axis of the resilient member and a partial rolling of the resilient member in an inside-out manner (i. e. about its own sectional center). Thrust in a direction at right angles to the arrow 46 and toward the frame 33 will it is seen also cause both compression and a partial rolling of the resilient member.

The modification shown in Fig. 6 corresponds closely with that shown in Figs. 1 to 3 and like parts are numbered identically. In the modification of Fig. 6, however, means such as an adhesive film is provided for adhering the resilient annulus 5 to at least one and preferably both of the rigid members 1 and 3. A layer of suitable heat-softenable, resin base composition or rubber-to-metal adhesive 41 may, for example, be disposed between the separately cured rubber annulus 5 and the bearing surface 2, or preferably the seat portion 11 thereof. Similarly, a layer of heat-softenable adhesive 40 may be disposed between the inner bearing surface 4, preferably only the seat portion 12 thereof, and the inner peripheral portion 6 of the annulus 5 prior to assembly of the components of the mounting.

After assembly, the parts may be adhered together by simply heating the assembled mounting in sufficiently short time to soften the adhesive layers 40 and 41. The adhesive between the outer and inner peripheral portions of the resilient member 5 may be any of the numerous rubber-to-metal adhesives for adhering vulcanized rubber to metal. Adhesive means which may be used are more fully described in the copending application of John H. Kelly, Jr. and Rosalind M. Glassco, Serial No. 587,356, now Patent No. 2,572,160, or in the copending application of Gilbert H. Swart, Serial No. 587,384, now Patent. No. 2,572,215. Both applications were filed April 9, 1945 and are assigned to the assignee of the present application. Any suitable means may be used for obtaining adhesion between limited annular portions in the region of the inner and outer peripheral portions 6 and 7, respectively, and the bearing surfaces 2 and 4 against which these portions normally bear. It will be seen in reference to Fig. 6 that loading of the mounting to cause movement of the bearing surfaces 2 and 4 more closely together causes a combination of rolling of the annulus in an inside-out (or outside-in) manner, and stretching of part of the surface of the annulus 5, with the result that exceptional characteristics for vibration-absorption are obtained in the mounting.

The mountings of the present invention have relatively large and relatively free initial movement and their load deflection characteristics are gradually stiffened by greater and greater contact of the resilient member with the bearing surfaces 2 and 4, so that after the position illustrated by Fig. 3 is reached, strain due to load in the direction of the arrow 16 is comparatively small.

It is also apparent that modifications of the invention may be made without changing the spirit thereof, and it is intended that the invention be limited only by the appended claims.

What I claim is:

1. A mounting of the type adapted to be interposed between two relatively movable members to support the same and prevent vibrations being transmitted from one to the other, comprising rigid bearing surfaces, one of which is adapted to be connected to each of said relatively movable members, an annulus of resilient material having a noncircular cross section and having one sectional axis substantially greater than the other and disposed between said bearing surfaces to prevent contact therebetween, the major sectional axis of said annulus forming an acute angle with said bearing surfaces, said annulus and said bearing surfaces being dimensioned so that said resilient annulus bears against annular portions of each of said bearing surfaces, whereby when such surfaces are moved towards each other the major sectional diameter of said resilient member is tilted first to a more acute angle relative to said bearing surfaces so as to be substantially parallel therewith and the load deflection characteristics of the mounting have a relatively low slope for small loads and a relatively high slope for high loads.

2. A vibration-insulating mounting comprising an outer rigid member having an inner, generally frusto-conical bearing surface, an inner rigid member having an outer, generally frusto-conical bearing surface disposed so that lines cut by a longitudinal axial plane through said bearing surfaces are generally substantially parallel, and a resilient annulus having an oblong section with one diameter greater than the other, said resilient annulus being disposed between said bearing surfaces of said inner and outer rigid members with the major diameter at an acute angle to said bearing surfaces, whereby upon movement of said bearing surfaces more closely together said annulus is first partially rotated about its own center of section to provide greater contact between said annulus and said bearing surfaces, and then compressed between said bearing surfaces.

3. A vibration-insulating mounting comprising an outer rigid member having an inner, generally frusto-conical bearing surface, an inner rigid member having an outer, generally frusto-conical bearing surface disposed substantially concentric with said inner bearing surface, and a resilient annulus having an oblong section with one diameter greater than the other, said resilient annulus being separately cured and being disposed between said bearing surfaces of said inner and outer rigid members with the major diameter at an acute angle to said bearing surfaces, whereby upon movement of said bearing surfaces more closely together said annulus is first partially rotated about its own center of section to provide increased area of contact between said bearing surfaces and said annulus, and then compressed between said bearing surfaces.

4. A vibration-absorbing support comprising inner and outer rigid members and a resilient annulus disposed between said members, said outer rigid member having an inner conical surface and being adapted to be secured to one of two relatively movable members, said inner rigid member having a conical outer surface being adapted to be secured to the other of said relatively movable members, said annulus having an oblong section with rounded end portions and having opposite sides respectively bearing against portions of said bearing surface of said inner and outer rigid members, the major sectional axis of said resilient member being disposed at an acute angle to the line formed by the intersection of a longitudinal axial plane through said bearing surface so that upon movement of said bearing surfaces axially towards each other partial rotation of said annulus in an inside-out manner occurs.

5. A vibration-absorbing mounting comprising an outer rigid member having an outer, generally cylindrical bearing surface, an inner rigid member having an outer, generally cylindrical bearing surface, and a resilient annulus of oblong section with rounded end portions, said annulus being disposed between said bearing surfaces with a major axis thereof at an acute angle relative thereto, the parts being proportioned so that said annulus bears against each of said bearing surfaces, whereby upon deflection of said bearing surfaces relative to each other a rotation of said annulus about its own center of section first occurs to provide relatively great deflection per unit of load for small loads and compression of more and more of said annulus between portions of said bearing surfaces progressively occurs at larger loads to provide relatively small deflection per unit of load at higher loadings.

6. The mounting of claim 3 having an edge portion of said bearing surface of said outer member curved to provide a retaining seat for said annulus.

7. The mounting of claim 3 having an edge portion of said bearing surface of said inner member curved to provide a retaining seat for said annulus.

8. The mounting of claim 3 having the edge portions of each of said bearing surfaces curved to provide seats for retaining said resilient annulus in assembled position.

9. A mounting according to claim 3 having means for adhering said resilient annulus to the bearing surface of said outer member in only the region of normal contact.

10. The mounting of claim 3 having means for adhering said resilient annulus to only a portion of the bearing surfaces of said inner and outer rigid members, the parts being dimensioned relative to each other so that upon greater deflection of the mounting by moving said bearing surfaces of the inner and outer rigid members toward each other greater contact is secured between said annulus and said bearing surfaces by rotation of said annulus.

11. The combination, with a mounting member and a mounted member having a shaft axis and parts adapted for rotation thereabout, of a mounting having a rigid member with an annular, inner, tapered bearing surface substantially concentric with said shaft axis, an inner rigid member having an outer, rigid, tapered bearing surface also substantially concentric with said shaft axis, and a resilient annulus of oblong section with rounded end portions disposed between and bearing against each of said bearing surfaces, the major axis of said resilient member being disposed at an acute angle relative to said bearing surfaces, one of said rigid members being attached to said mounted member and the other of said rigid members being attached to said mounting member, whereby axial movement of said rigid members causes rotation of said resilient annulus about its center of section.

12. The combination, with a mounting member and a mounted member having a shaft axis and parts adapted for rotation thereabout, of resilient mountings disposed at each end of said mounted member, each of said mountings having a rigid member with an annular, inner, tapered bearing surface substantially concentric with said shaft axis, an inner rigid member having an outer, rigid, tapered bearing surface also substantially concentric with said shaft axis, and a resilient annulus of oblong section with rounded end portions disposed between and bearing against each of said bearing surfaces, the major axis of said resilient member being disposed at an acute angle relative to said bearing surfaces, one of said rigid members being attached to said mounted member and the other of said rigid members being attached to said mounting member, the mountings at opposite ends of said mounted member being disposed so that the taper is opposite, whereby axial movements of said rigid members causes rotation of said resilient annulus in an inside-out direction, that is, about a circumferential axis that passes through all transverse sections of said annulus.

13. The combination, with a mounting member and a mounted member having a shaft axis and parts adapted for rotation thereabout, of a mounting having a rigid member with an annular, inner bearing surface substantially concentric with said shaft axis, an inner rigid member having an outer, rigid bearing surface also substantially concentric with said shaft axis, and a resilient annulus of oblong section with rounded end portions disposed between and bearing against each of said bearing surfaces, the major axis of said resilient member being disposed at an acute angle relative to said bearing surfaces, one of said rigid members being attached to said mounted member and the other of said rigid members being attached to said mounting member, whereby axial movement of said rigid members causes rotation of said resilient annulus in an inside-out direction, that is, about a circumferential axis that passes through all transverse sections of said annulus.

JOHN R. BENNETT.

REFERENCES CITED

The following references are of record in the file of this patent:

UNITED STATES PATENTS

| Number | Name | Date |
|---|---|---|
| 1,811,923 | Flintermann | June 30, 1931 |
| 1,971,417 | Kingston et al. | Aug. 28, 1934 |
| 2,023,756 | Brownyer | Dec. 10, 1935 |
| 2,162,714 | Hamblin | June 20, 1939 |
| 2,179,959 | Schroedter | Nov. 14, 1939 |
| 2,240,150 | Seyfried | Apr. 29, 1941 |
| 2,262,443 | Anderson | Nov. 11, 1941 |

FOREIGN PATENTS

| Number | Country | Date |
|---|---|---|
| 296,503 | Italy | May 18, 1932 |